400;695

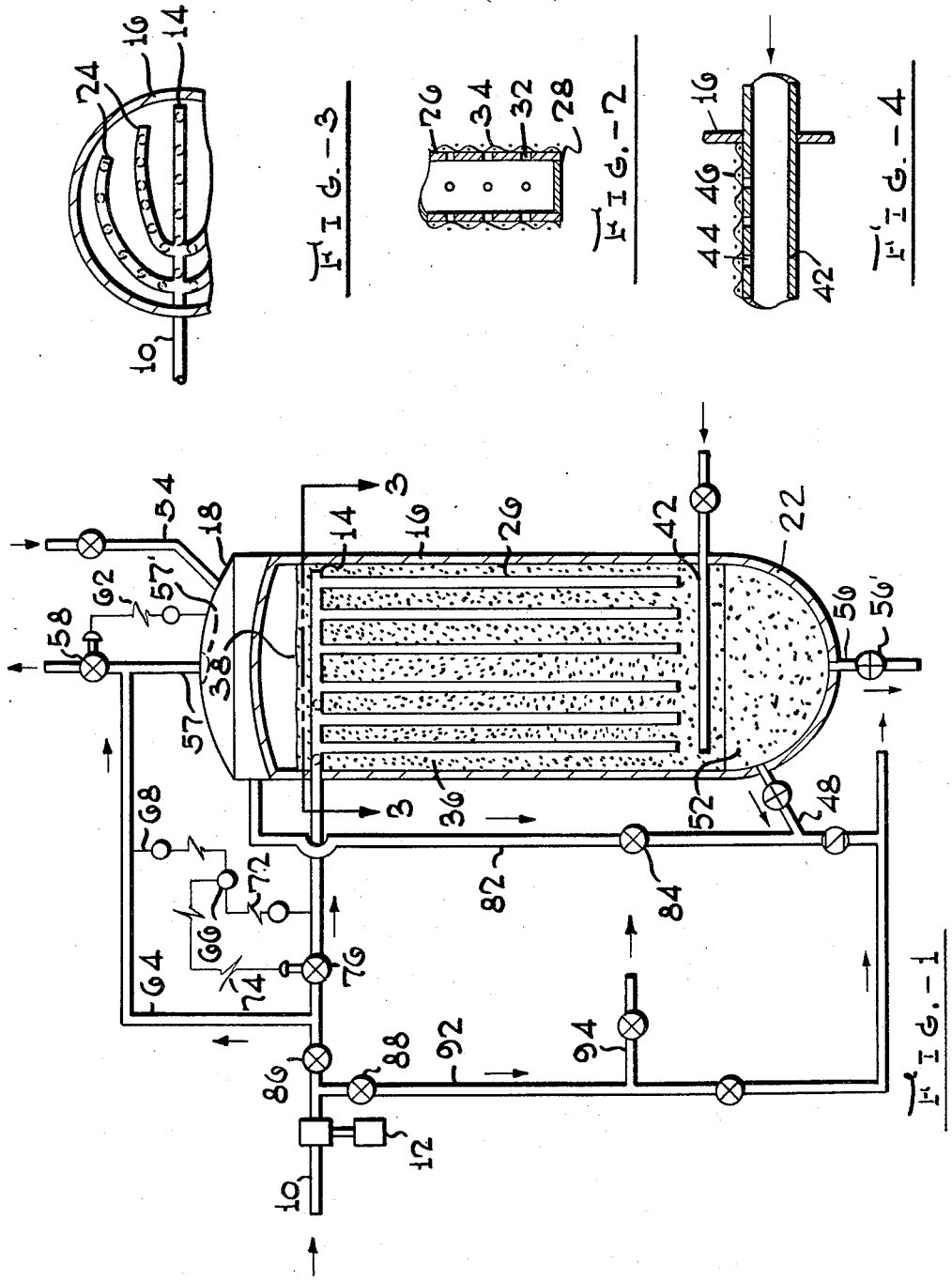

Patented Apr. 23, 1957

2,789,695

TREATING HYDROCARBON OILS

Raymond W. Winkler, Westfield, Homer Z. Martin, Cranford, and Arnold F. Kaulakis, Chatham, N. J., assignors to Esso Research and Engineering Company, a corporation of Delaware Application December 30, 1952, Serial No. 328,546

5 Claims. (Cl. 210—80)

This invention relates to methods and apparatus for treating hydrocarbon oils which are to be substantially freed of foreign substances and more particularly relates to removing catalyst contaminants from hydrocarbon oil feeds by filtration.

In catalytic cracking processes it is known that certain metal or metal compounds such as iron, sodium, nickel, vanadium, etc. are harmful to catalysts. A catalyst contaminated in this way produces more coke and gas at the expense of valuable gasoline and heating oil fractions.

Metallic impurities such as oil-soluble, metallo-organic compounds are present in the hydrocarbon oil feed and it is thought they are formed by corrosion of pipe lines and tanks by naphthenic and other type acids present in the feed stock. Some of these compounds are also present in the original crude oil and are entrained in vapors from the crude stills.

According to the present invention hydrocarbon oil which is preferably a distillate oil such as gas oil is heated and pumped under superatmospheric pressure through a large number of vertically arranged perforated tubes or pipes imbedded in a filter bed such as sand. During filtration there is a pressure maintained on the filter bed to keep it stationary. Filtered oil is removed and passed to a catalytic cracking unit. During filtration the ash and other catalyst contaminants are effectively removed. Preferably screens are placed over the perforated pipes to keep the sand in place. Filter cakes are formed around the outside surfaces of the perforated pipes.

When the pressure drop across the filter becomes excessive, the filtration cycle is terminated and the sand or other filter bed is agitated with steam or other fluid after the pressure on the bed is released. The steam or other fluid is introduced into the bottom portion of the sand or other bed below the lower ends of the perforated pipes. This agitation may be carried out to disperse the broken filter cake into the filter bed or it may be carried out to elutriate the small filter cake particles from the bed. The contaminant particles are exceedingly small, less than about 10 microns and the bed particles are sized larger to allow elutriation. The velocity of the blowback fluid and the fluidization characteristics of the used bed will determine which operation is performed.

The agitation may also be carried out by flowing oil upwardly from the perforated pipes. A guard section is provided in the bottom of the filter below the region of addition of the blowback or agitating fluid which is used to break up the filter cake. This guard section is made up of the same material that the filter bed is made of. When the filter bed is agitated, the guard section will not be disturbed and thus will not contain any dispersed filter cake particles. The filtered oil is preferably removed from the guard section during the filtering operation.

Periodic replacement of the filter bed is necessary. This can be done by replacing the entire filter bed or it can be done by adding fresh filter material such as sand to the bed through the steam or other blowback injectors which are used to agitate the filter bed. At the same time an equivalent amount of contaminated filtering material would be removed at the top.

According to this invention the filtering operation has the advantage of high temperature operation and also relatively high pressure drops may be tolerated. By heating the relatively heavy hydrocarbon oil to an elevated temperature, the viscosity of the oil is greatly reduced so that it flows better. An additional advantage of the high temperature operation is provided by this invention. Apparently asphaltic materials collect on the filter cake at lower temperatures (300° F.) thus shortening the life of the filter (that is, the time to reach maximum pressure drop) or reduces the allowable filtration rate. These materials, however, do not cake out at 600° F. and are not harmful in the feed stock.

Also the high permissible pressure drop is afforded by the mechanical rigidity of the filtering apparatus. Because of these features the filtration cycle can be carried out for a relatively long time before blowback or agitation of the filter bed is required. With the present invention a large filter area per unit of vessel volume is obtained.

In the drawing:

Fig. 1 represents a front elevation of one form of apparatus adapted for practicing the present invention;

Fig. 2 represents an enlarged sectional detail of one of the perforated oil feed pipes;

Fig. 3 represents a partial sectional view taken generally on line 3—3 of Fig. 1 and showing one form of manifold for the oil feed pipes; and Fig. 4 represents a sectional detail of the blowback means for injecting fluid to the filter bed for agitating the bed following a filtration cycle.

Referring now to the drawing the reference character 10 designates a feed line through which oil to be treated is passed by pump 12 under a pressure of about 100 to 250 p. s. i. g. (pounds per square inch gage), preferably 150 p. s. i. g. The hydrocarbon oil to be treated may be any oil but the invention will be particularly described in connection with a catalytic cracking feed stock such as a gas oil. The gas oil may be West Texas, Louisiana, South American or others, or mixtures of these. The initial boiling point of light gas oil is about 450° F. Typical ash content is from 2–15 p. t. b. (pounds per thousand barrels). The oil is heated to a temperature of about 400° to 650° F., preferably to about 600° F. The heated oil is introduced into a manifold or header 14 arranged in a vertically arranged vessel 16 shown as having a rounded top portion 18 and a rounded bottom portion 22 but which may be of different shape.

The manifold 14 is shown in Fig. 3 as made up of a plurality of pipes or tubes 24 which extend from inlet line 10 so that oil is fed to all the pipes or tubes 24. Depending or descending from pipes 24 and in fixed relation thereto are vertical tubes 26 which communicate at their upper ends with manifolds 24 to receive oil therefrom. Each tube 26 has a bottom closed end 28 (see Fig. 2) and perforations or holes 32 extending for the length of each tube. Covering the perforations or holes 32 is screening 34 which is on the exterior of the tubes 26. The tubes are preferably equidistantly spaced in the bed of filtering material 36 and extend for a substantial length of the vessel 16, extending from near the rounded top portion 18 to near the rounded bottom portion 22 of vessel 16. In a 4 inch pipe the perforations 32 are about $\frac{1}{64}$ to $\frac{3}{8}$ inch in diameter. Oil introduced into manifold 14 flows down through pipes 26 and out through holes 32 into the bed 36 of the filtering material presently to be described.

The manifold 14 and connected bank of tubes 26 are submerged or imbedded in the bed 36 of filtering material comprising finely divided (closely sized) inert particles. The preferred filtering material is sand which will be referred to hereinafter in the description of the invention but other inert particles such as spent cracking catalyst, diatomaceous earth, mullite, refractory alumina, etc. may be used. As sand, Ottawa sand may be used. During filtration the bed 36 is fixed or stationary. The top 38 of bed 36 extends a distance above manifold 14 but is preferably below rounded top portion 18 of the vessel 16.

Arranged below the lower ends of vertical tubes 26 is one or more horizontal tubes 42. Tube 42 may be of a shape similar to manifold 14 having pipes 24 or it may take other shapes. A grid arrangement may be placed above tube 42 to insure good distribution. The upper portion of tube or tubes 42 is provided with perforations or holes 44 (see Fig. 4) which have an outside covering of screening 46 to prevent filtering particles from entering tube 42. Tube or tubes 42 provide a blowback means for the introduction of steam or other fluid to agitate the filtering bed following a filtration cycle.

The oil after passing through the filter bed 36 is withdrawn from the lower portion of the bed 36 above the bottom thereof through line 48 which leads from the bottom rounded portion 22 of vessel 16. Filtering material below tube 42 and in rounded bottom portion 22 indicated at 52 forms a guard section and it is from this guard section that filtered oil is withdrawn through line 48. The filtering material in guard section 52 is not disturbed when the bed is agitated following a filtration cycle and does not contain dispersed filter cake which might be taken up by filtered oil when filtration is resumed. The guard section also serves as a filtering medium in case any channeling develops in the upper section.

Inlet line 54 is provided at the top of vessel 16 for the introduction of filtering material at the beginning of the operation or at any desired time during operation of the process. A drain pipe 56 and valve 56' are provided at the bottom of the bottom rounded portion 22 of vessel 16. The drain pipe 56 is used for removal of the oil from vessel 16 before beginning the blowback step. Drainpipe 56 is provided with a removable screened section (not shown) which would then allow it to be used for draining sand if necessary.

A top vent line 57 extends from the top of vessel 16 from the top of the upper rounded portion 18. The vent line 57 is provided with a safety valve 58 and pressure control means generally indicated at 62 which communicates with the upper internal portion of vessel 16 so that if the pressure in the vessel 16 exceeds a safe limit, safety valve 58 will be opened to relieve the pressure. A screen covering diagrammatically shown at 57' is provided for the inlet to vent line 57.

A small portion of the feed oil is utilized to maintain the pressure above the filtering bed 36 to prevent movement of the filtering bed which would tend to break portions of the filter cake formed on the exterior of pipes 26 and allow by-passing of unfiltered oil to the outlet 48. This control is effected as follows: A portion of the oil feed from line 10 is by-passed through line 64 to vent line 57 below safety valve 58 to maintain the pressure above filtering bed 36 above the pressure in the bed 36. A pressure differential control device is generally indicated at 66 and includes pressure responsive means 68 associated with and communicating with line 64, pressure responsive means 72 associated with and communicating with line 10 and pressure responsive means 74 connected to control valve 76 in line 10 upstream from control 72. Pressure responsive means 68 and 72 are interconnected so that the differential pressure actuates control valve 76.

If the pressure above filtering bed 36 decreases for any reason and becomes less than that in line 10 downstream from control valve 76 this will be detected by pressure responsive means 68 and 72 and device 66 will actuate means 74 to partly close valve 76 and cause more oil to pass through line 64 to build up the pressure in the top of vessel 16 above bed 36 to the desired level. If the reverse happens and there is too much pressure build-up in the vessel above bed 36 the control means operates to move valve 76 to a greater opening to reduce pressure above the bed 36.

A line 82 is provided which communicates with the upper portion of vessel 16 above the level of bed 36 and leads to outlet line 48 for draining oil from above bed 36 in vessel 16 when shutting down the filter. A valve 84 is provided in line 82.

After the filter has been used for some time the pressure drop across the filter becomes excessive and the filtration cycle is then stopped. Valve 86 in line 10 is closed and valve 88 in line 92 is opened and the oil feed may be passed directly to the catalytic cracking unit without filtering but preferably it is passed through valved line 94 to another filtering unit similar to vessel 16 while vessel 16 is being regenerated.

After the filtration cycle in vessel 16 is terminated, the pressure above the bed is released by opening valve 58 in vent line 57 and oil is drained from vessel 16 using lines 82 and 56 and valves 84 and 56'. During filtration as the oil to be filtered flows through openings 32 in pipes 26, filter cakes are formed around the outside surface of the pipes and these cause the increased pressure drop causing the shut down. The bed is then regenerated or remade by one of the two methods. According to the first method superheated steam or other suitable high temperature fluid is introduced into the lower portion of the filtering bed below the tube bank 26 and above guard section 52. The steam or other fluid passes upwardly through the filtering bed at a superficial velocity of about 0.5 to 4.0 feet per second to agitate the bed and disrupt the bed to break up the filter cakes on the exterior of pipes 26 and to disperse the broken filter cake particles within the bed. The steam or other gas causes sufficient agitation of the filtering bed so that exceedingly good mixing of the bed is obtained to break up the filter cake and clean off the filter cake from the screening 34 surrounding the pipes 26 and from the pipes 26. Instead of dispersing the filter cake in the filter bed 36, the operation can be carried out using a higher velocity of the backwashing fluid to elutriate the small contaminant particles from the bed. These particles would be removed from vent line 57 or merely allowed to accumulate on the top surface of bed 36.

In the other method, after releasing the pressure above the bed, the filter bed 36 is agitated by introducing feed oil through pipe 42. The upward flow of feed oil causes agitation of the bed and this would break up the filter cake adhering to screening 46 and to the exterior of pipes 26 and disperse the filter cake particles within the bed. Or, oil may be added to the vessel and then steam blown through to agitate the oil-sand mixture.

During the remaking of the filter bed as above described, the guard section 52 is not agitated and thus does not contain any dispersed filter cake.

After the remaking of the filter bed the bed is allowed to settle and pressure is reapplied to the top of the bed by closing control valve 76 and opening valve 86 and the bed is again put on a filtration cycle. When the desired pressure is restored above the bed 36, control valve 76 is put on automatic operation.

After the filtering bed has been in use for some time and after a number of regenerations or remakings, replacement of the entire bed may be necessary. However, instead of replacing the entire filter bed entirely, the filter bed may be partially removed and replaced by fresh filtering material. For example, during the remaking of the filter bed after one or more filtration cycles, fresh clean sand may be added through the blowback injector pipe or pipes 42 with blowback fluid. At the same time an equivalent amount of sand would be removed from the top of the filter bed through vent line 57. The sand contained in the guard section is replaced only when the entire bed of sand is replaced, for example, every 100 or so cycles.

The effectiveness of filtration is related to the porosity of the filter. The porosity of a sand bed is determined by the sand particle size. Filter particles in the range of about 35 to 50 microns will give a filter bed porosity of about 5 microns with the sand particles being closely packed. A filter bed made up of sand particles of a size in the range of 50 and 90 microns will remove about 90% of the iron contaminants in a gas oil feed. Using sand particles of about 100 to 125 micron size will give a filter bed of about 15 micron porosity which is not as efficient in the removal of iron contaminants from hydrocarbon feed oil as is the 5 micron porosity bed. Sand particle size may be between about 25 and 150 microns, the smaller sizes being preferred.

In carrying out the filtration cycle the major portion of the pressure drop through a sand filter will occur in the filter cake formed on the exterior of pipes 26 and in the screening 34. The pressure drop through the sand itself is not a significant factor in the filtering step or cycle. As the filter cake builds up on the pipes 26 there will be an increase in pressure drop and when this pressure drop becomes excessive, more than say about 100 p. s. i. g., the filter bed is remade by agitation to break up the filter cake and disperse the filter cake particles in the sand bed. The limitation as to pressure drop depends on vessel design pressure and available pressure drop from feed pump. Since the volume of the filter cake to the sand bed is very small substantially none of the dispersed filter cake will be washed into the filtrate nor will the pressure drop through the bed increase significantly.

A description of the process will now be given. Gas oil such as West Texas, Louisiana, South American or mixtures thereof at a temperature of about 400° to 650° F. and under a super-atmospheric pressure of about 100 to 250 p. s. i. g. is passed through line 10 by pump 12. In general, a hydrocarbon oil boiling above about 450° F. may be used. Some of the oil under pressure passes through lines 64 and 57 to apply pressure above the filter bed 36 which comprises sand having a particle size of about 25 to 150 microns. The oil passes through header or spider 14 to vertical distributor pipes 26 imbedded in the filter bed. The openings 32 in pipes 26 distribute the oil to be treated as a multiplicity of small streams throughout the filter material in the filter bed 36 to give large filter areas per unit of vessel volume.

Filtered oil under pressure is removed via line 48 from the lower portion of vessel 16 below the blowback injector 42. By applying pressure above the filter bed, the bed is maintained rigid or stationary so as not to break the filter cake as it forms on the exterior of pipes 26 and on the screening covering pipes 26. As filtering proceeds, the filter cake builds up and the pressure drop through the filter increases. When the pressure drop reaches about 75 to 125 p. s. i., which will correspond to a filtration cycle of about 8 to 48 hours, the filtration is stopped in this unit and the oil is preferably passed to another similar filtering unit via lines 92 and 94.

Pressure is then released from the top of the bed 36 via vent line 57. Then high temperature steam at a temperature of about 500° to 600° F. and under a pressure of about 100 to 125 p. s. i. g. is introduced into the bottom portion of filter bed 36 through steam distribution manifold or spider 42. The steam breaks up the filter cake by agitating the filter bed and mixes the filter cake particles with the bed. By this agitation during blowback the filter cake particles are removed from pipes 26 and screening 34 and substantially uniformly dispersed in the filter bed. The blowback is continued for about ½ to 2 hours. During blowback it is important to maintain the temperature at about the filtering temperature to avoid stress and strain on the apparatus.

The filter bed is thus made ready for another filtration cycle. Before filtration is resumed, the filter bed is allowed to settle and pressure is reapplied to the top of the filter bed 36 by closing valve 76 and opening valve 86. During blowback the sand in guard section 52 was not disturbed so that the guard section will not contain any dispersed filter cake particles and when filtration is resumed the sand in the guard section below blowback pipe or spider 42 and above withdrawal line 48 will act as a filter to remove any small amount of filter cake particles present. If the incremental sand addition method is used, it is not necessary to replace the entire bed at any time. When the filter bed becomes exhausted, the filter bed is removed via line 56 and then a new sand bed is supplied to vessel 16 via line 54.

By using the distributing pipes 26 a much smaller filtering vessel is needed than would be the case if the oil were passed through a bed of and without the distributing pipes.

One design for practicing the present invention and for treating about 40,000 barrels per day of oil is as follows. The feed oil which is a West Texas gas oil or any hydrocarbon oil having an initial boiling point of about 450° F. is heated to about 600° F. and put under a pressure of about 100 p. s. i. g. The oil has about 0.2 to 1.0 pound per 1000 barrels of iron contaminant. The vessel 16 has an inside diameter of 7 feet, 6 inches and a length of 19 feet on the straight side, that is, on a straight line from the top of the bottom rounded portion 22 to the bottom of the top rounded portion 18 of vessel 16. The material forming the bed 36 is made up of closely sized particles such as finely ground sand, having a particle size of about 50 to 90 microns. There are one hundred twenty-six 4 inch pipes 26 in which the perforations are $\frac{1}{32}$ inch in diameter and 16 feet in length. The pipes 26 are perforated throughout their length. The screen 34 covering pipes 26 extends from the top of each pipe 26 beneath manifold 14 to the bottom of each pipe 26. The screen is of a sufficiently fine mesh to prevent the sand particles from entering the oil feed pipes 26.

The pressure in vessel 16 is less than about 100 p. s. i. g. during the filtration cycle and the vessel 16 is constructed to withstand a pressure of about 250 p. s. i. g.

The filtration step is continued for about 8 hours, the filtration rate being about 30–35 gallons per hour per square foot of filtering surface. The filtered oil from which about 90% of the iron contaminant has been removed is withdrawn through line 48 and passed to a catalytic cracking unit such as a fluid unit to crack the oil. As the filtered oil is at a temperature of about 600° F., advantage is taken of this heat content and the filtered oil is passed directly to a fluid catalytic cracking unit where heat of cracking and vaporization are supplied by the hot regenerated catalyst. The cracking temperature is about 850° F. to 1000° F. and a sufficient amount of hot regenerated catalyst at a temperature of about 1000° F. to 1150° F. is used to supply heat of vaporization and cracking.

The filter vessel 16 is then taken off stream, depressured and steam at a temperature of about 600° F. and 125 p. s. i. g. is introduced via distributor 42 into the sand filter bed 36 above guard section 52 but below tube bank 26 to agitate the sand bed, break up the filter cake and disperse the cake in the sand bed. Distributor 42 may be constructed of a plurality of arms similar to header arms 24. The distributor 42 may be of the same size as the pipes 26, that is, 4 feet in diameter with $\frac{1}{32}$ inch holes with a screen covering to prevent sand from entering distributor 42. Of course, the distributor will be made of pipes shorter than pipes 26 in the design shown in the drawing.

This blowing or backwashing with steam is continued for about ¾ hour. The steam is then shut off, the filter bed is allowed to settle, pressure reapplied to the top of the bed and then filtration is again resumed in vessel 16.

The guard section in the specific design given extends for about 5 feet being made up by 4 feet of the domed bottom 22 and 1 foot on the straight side of vessel 16.

What is claimed is:

1. A process of preparing gas oils for catalytic cracking to remove catalyst contaminants therefrom, which comprises passing into a filtering zone a gas oil at elevated temperature and under superatmospheric pressure as a plurality of confined streams into the upper portion of a compact filter bed made up of finely divided inert solid particles but out of contact therewith, then subdividing the plurality of confined streams into a multiplicity of smaller streams which contact the filter bed material at a multiplicity of regions throughout substantially the entire volume of the filter bed, withdrawing filtered oil from the bottom of said filter bed, continuing passage of oil through said filter bed until filter cakes build up at the regions of contact of the multiplicity of oil streams and filter material and the pressure drop through said filter bed is excessive, stopping the flow of oil through said filter bed, releasing the pressure on said filter bed, introducing a heated gas under superatmospheric pressure into the lower portion of said filter bed and a sufficiently high velocity to agitate and disrupt the bed and break up the filter cake and disperse the broken filter cake particles in said filter bed to reconstitute the bed while said filter bed remains in said filtering zone, and then stopping the flow of the heated gas and allowing the filter bed to settle.

2. An apparatus for treating oil which includes a vertical vessel containing a bed of finely divided inert filtering material resting on the bottom of said vessel and extending up to near the top of said vessel a horizontally arranged header in the upper portion of said vessel and submerged in the upper portion of said bed of said filtering material, a plurality of vertical perforated pipes depending from said header and in communication therewith and having closed bottom ends which extend to near the bottom of said vessel, said pipes being completely submerged in said filtering material, means for feeding oil to said header for distribution to said perforated pipes, said perforations in said pipes acting to distribute oil to the filter bed as a multiplicity of streams, means for maintaining said vessel under superatmospheric pressure, means for withdrawing treated oil from said bed of filtering material below the closed ends of said pipes and above the bottom of said vessel and a second horizontally arranged header arranged below the closed ends of said pipes but a substantial distance above the bottom of said vessel and above said means for withdrawing treated oil from said vessel, said second header being provided with openings in its top surface only for the introduction of a fluidizing medium following an oil treating step.

3. An apparatus for treating oil which includes a vertical vessel containing a bed of finely divided inert filtering material resting on the bottom of said vessel and extending up to near the top of said vessel, a horizontally arranged header in the upper portion of said vessel and submerged in said filtering material, a plurality of vertical perforated pipes depending from said header and in communication therewith and having closed bottom ends which extend to near the bottom of said vessel, said pipes being submerged in said filtering material, means for feeding oil to said header for distribution to said perforated pipes, said perforations in said pipes acting to distribute oil to the filter bed as a multiplicity of streams, means for maintaining said vessel under superatmospheric pressure, means for withdrawing treated oil from said bed of filtering material below the closed ends of said pipes and a second horizontally arranged header arranged below the closed ends of said pipes but a substantial distance above the bottom of said vessel and above said means for withdrawing treated oil from said vessel, said second header being provided with openings in its top surface only for the introduction of a fluidizing medium following an oil treating step, said filter bed in the bottom of said vessel below said second header forming a guard section, said means for withdrawing treated oil from said vessel communicating with an intermediate portion of said guard section.

4. A process of preparing gas oils for catalytic cracking to remove catalyst contaminants therefrom which comprises passing into a filtering zone a gas oil at elevated temperature and under superatmospheric pressure as a plurality of confined streams into the upper portion of a compact stationary filter bed made up of finely divided inert solid particles but out of contact therewith, then subdividing the plurality of confined streams into a multiplicity of smaller streams which contact said filter bed material at a multiplicity of regions throughout substantially the entire volume of said filter bed, withdrawing filtered oil from the bottom portion of said filter bed, continuing passage of oil through said filter bed until filter cakes build up at the regions of contact of the multiplicity of oil streams and filter material and the pressure drop through said filter bed is excessive, stopping the flow of oil through said filter bed, releasing the pressure on said filter bed, introducing a heated fluid into the lower portion of said filter bed but above the bottom thereof to provide a quiescent section of solid filter particles in the bottom portion of said filter bed through which the treated oil is passed and then withdrawn from said filter bed, said heated fluid passing upwardly through said filter bed at a velocity sufficiently high to agitate and disrupt said filter bed above said quiescent section and to break up the filter cake particles in said filter bed and disperse the filter cake particles in said filter bed above said quiescent section to reconstitute said filter bed while said bed remains in said filtering zone, then stopping the flow of heated fluid and allowing the solid particles of said filter bed to settle.

5. A process for removing catalyst contaminants from hydrocarbon oils which comprises passing a relatively heavy distillate liquid oil at elevated temperature and under superatmospheric pressure as a multiplicity of streams into a confined stationary mass of inert finely divided solid filtering particles in a filtering zone, withdrawing filtered oil from the lower portion of said filter mass, continuing passage of the distillate oil into said filter mass until filter cake builds up at regions where the oil contacts said filter mass and there is an undue rise in pressure drop in said filter mass, stopping the flow of oil through said filter mass, passing a heated fluid upwardly from a lower portion of said filter mass through said filter mass at a sufficiently high velocity to agitate and disrupt the bed and break up the filter cake and to disperse the broken filter cake particles in said filter mass to reconstitute said filter mass while said filter mass remains in said filtering zone, then stopping the flow of the heated fluid and allowing the solid particles of said filter mass to settle, said heated fluid being introduced into the lower portion of said filter mass but above the bottom thereof to provide a quiescent section of filter particles in the bottom portion of said filter mass through which the treated oil is passed and then withdrawn from said filter mass.

References Cited in the file of this patent

UNITED STATES PATENTS

| | | |
|---|---|---|
| 1,716,974 | Payne | June 11, 1929 |
| 2,031,711 | Jaenicke et al. | Feb. 25, 1936 |
| 2,073,638 | Houdry | Mar. 16, 1937 |
| 2,108,087 | Thayer | Feb. 15, 1938 |
| 2,154,434 | Bond | Apr. 18, 1939 |
| 2,170,180 | Youker | Aug. 22, 1939 |